United States Patent Office 3,115,034
Patented Dec. 24, 1963

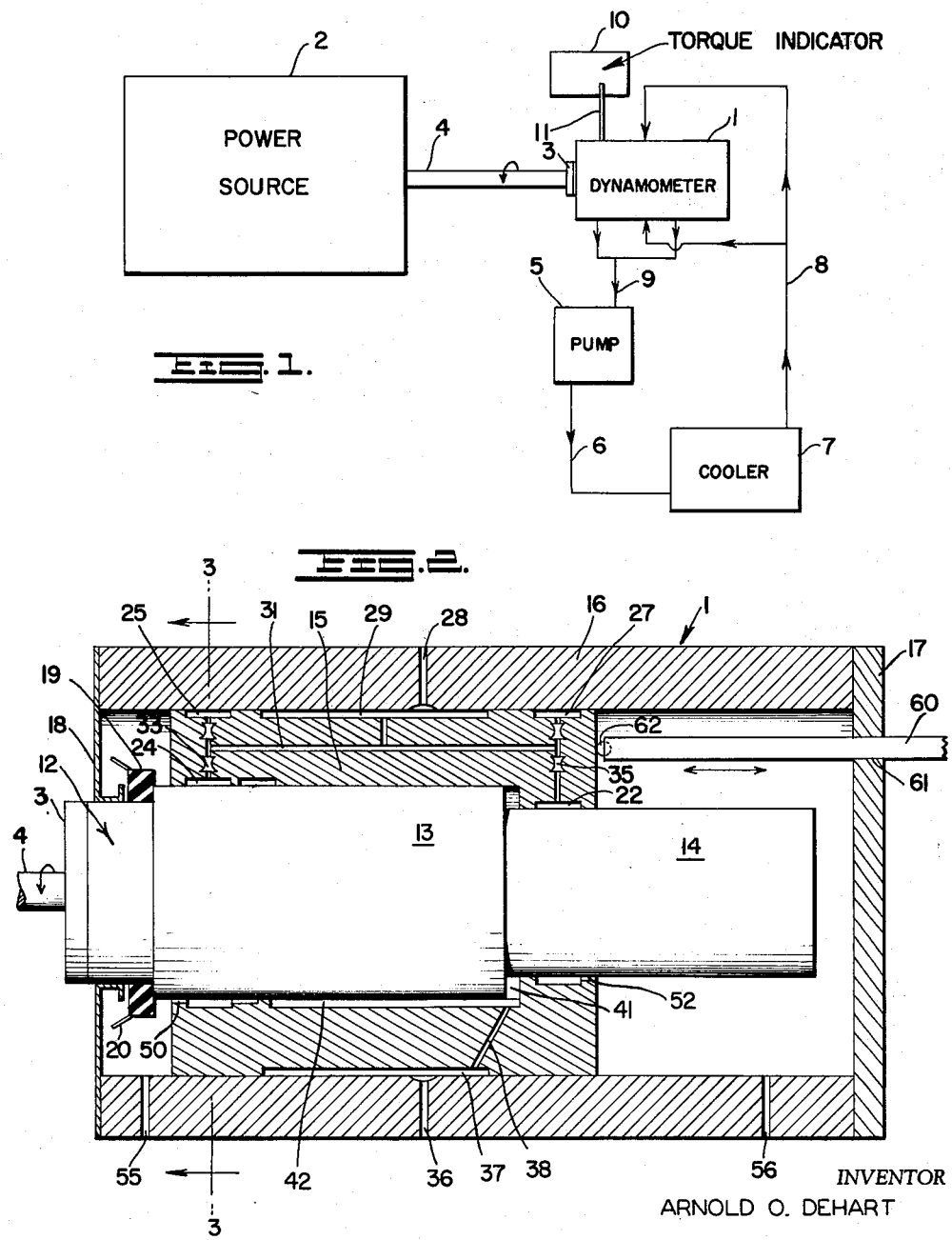

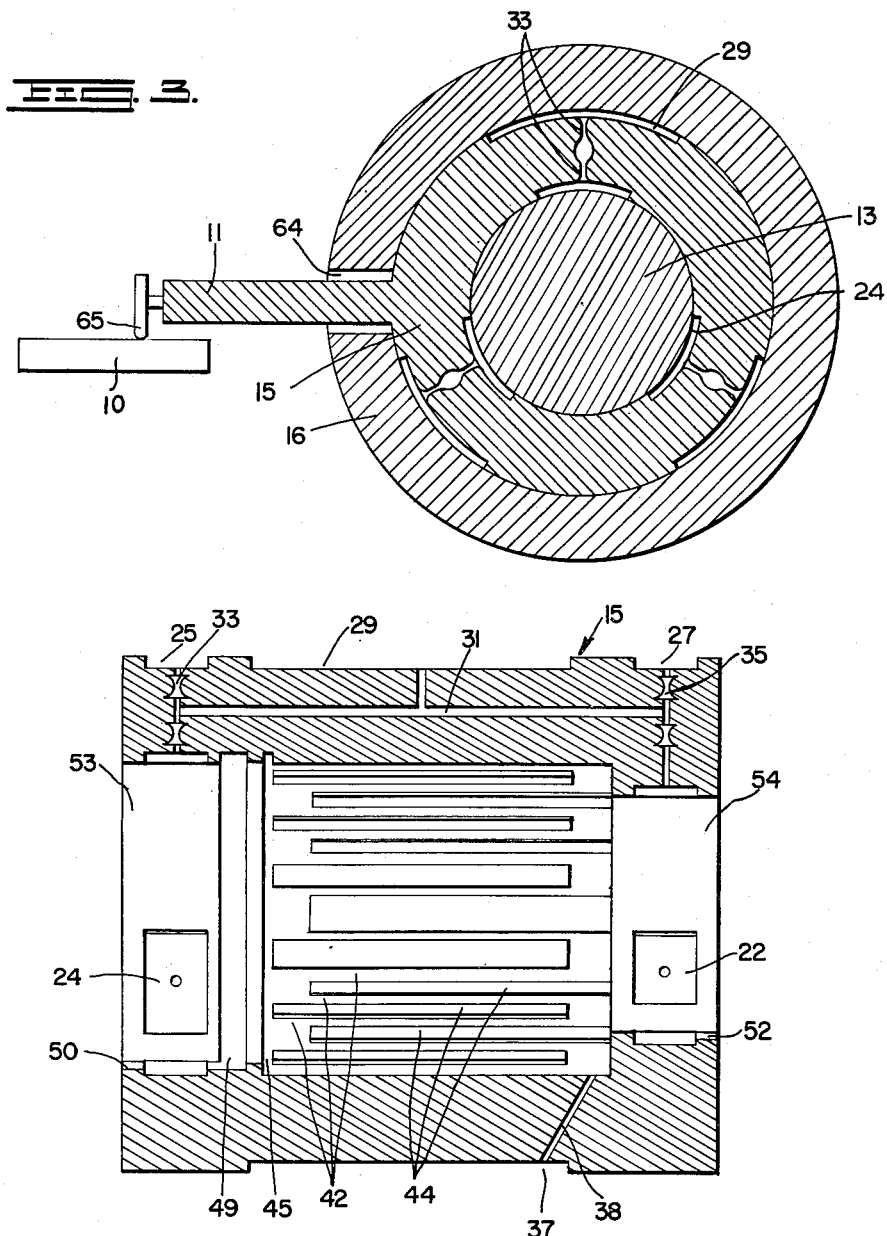

3,115,034
HIGH SPEED DYNAMOMETER
Arnold O. De Hart, Warren, Mich., assignor to General Motors Corporation, Detroit, Mich., a corporation of Delaware
Filed Jan. 20, 1960, Ser. No. 3,639
3 Claims. (Cl. 73—134)

This invention relates generally to dynamometers, and more particularly to the coupling means for transmitting reaction torque between relatively movable parts of a dynamometer.

Various types of dynamometers or rotary power measuring devices which are electrical or mechanical in nature have been invented prior to this time and some of these devices have attained great success. While the electrical type is generally more sensitive, it is often advantageous to be able to use a dynamometer which is non-electrical. If, however, a sensitive non-electrical unit is employed, it is too often true that the sensitivity does not withstand the test of time due to frictional wear, and consequenly reproducibility of results is poor. A further serious limitation common to most commercial dynamometers is that the range of torque which may be tested is relatively limited.

It is therefore an object of this invention to provide a dynamometer which is capable of detecting small torque variations and which is substantially free of mechanical friction. This object is accomplished by providing a dynamometer wherein torque reaction is transmitted from the driving member to a reaction member through viscous shear forces set up in a fluid that couples the members together.

Further objects of this invention are to provide a dynamometer that is particularly adaptable to measuring the performance of high-speed, low-power devices; capable of being coupled directly to the power devices being tested; capable of operating over a wide range of loads; and capable of reproducing extremely accurate results.

In general, the subject invention concerns the testing of a rotary power device by means of viscous shear forces developed in a fluid of some sort, preferably oil. The oil is placed between two adjacent surfaces, one of which is moving at a high speed in relation to the other. The viscous shear forces developed in the enclosed liquid transmit the torque of the high speed surface to the relatively stationary surface in the form of a reaction torque. The resultant torque developed in the latter surface gives an indication of the relative power of the high speed surface and accordingly of the power device under test. The size of the interfacial or reaction area and the clearance between the surfaces determine the amount of power transmission through the viscous fluid, and if either or both of these two factors are variable, a very useful viscous shear dynamometer results which is especially suitable for low-power, high-speed applications.

The above and other objects will be apparent from a study of the following description when read in connection with the accompanying drawings wherein like numerals represent like parts, and wherein:

FIGURE 1 is a schematic view of the equipment utilized with the present invention;

FIG. 2 is a longitudinal sectional view of a dynamometer embodying the present invention;

FIG. 3 is a cross-sectional view taken on line 3—3 of FIG. 2; and

FIG. 4 is a longitudinal sectional view of the reaction sleeve of the dynamometer shown in FIGS. 2 and 3.

Referring now to FIG. 1, the subject dynamometer 1 is arranged to measure the power output of power source 2. The dynamometer may be directly attached to the power source through a suitable coupling 3 on a power shaft 4. The dynamometer is provided with a viscous fluid between close fitting surfaces thereof in which fluid shear forces are set up proportional to the torque developed by the power source. To provide this fluid a pump 5 is connected to the dynamometer through a conduit 6, a fluid cooler 7 and conduits 8 to the inlet ports of the dynamometer. Conduits 9 connect the outlet ports of the dynamometer to the inlet or suction side of the pump 5 thereby providing a closed circuit for the pressurized fluid.

The resultant torque as evolved by the dynamometer 1 is transferred to a torque indicator 10 through a lever arm 11. The lever arm arrangement is more fully explained hereinafter and is shown in more detail in FIG. 3.

In FIG. 2, the power or driving shaft 4 of the power source is connected through a standard coupling 3 to the driven shaft 12 of the dynamometer 1. The driven shaft 12 has at least two sections 13 and 14 of different diameters, the first section 13 being of larger diameter than the second section 14. The shaft 12 is provided with an annular reaction sleeve or collar 15 that is longitudinally slidable along the shaft 12. A housing 16 provided with suitable end caps 17 and 18 encloses the sleeve 15 and shaft 12. A suitable seal arrangement including a rubber ring 19 and a guard 20 may be placed at the opening between the shaft 12 and end cap 18. The rubber ring 19 may also serve as a stop for sleeve 15 as the latter moves longitudinally towards the ring. Other seal arrangements well known to those having ordinary skill in the art may be substituted for this one.

To centrally position and journal the driven shaft 12 within the sleeve 15, two series of hydrostatic bearing pads 22 and 24 are provided on the inner periphery of the sleeve 15. A similar pair of bearing pads 25 and 27 are provided on the outer periphery of sleeve 15 to locate and support the sleeve within the housing 16. These pads are shown in more detail in FIGS. 3 and 4 and will be more fully discussed in connection with these figures. Inlet passage 28 is provided in the housing to supply hydraulic fluid under pressure to the bearing pads. Conduit 8 is attached to this inlet passage. A slot 29 on the outer periphery of housing 15 serves as a receptacle of fluid entering at inlet 28. Passageways 31 are provided in the interior of the sleeve 15, and two sets of viscous restrictors 33 and 35 are disposed in the passageways 31. This set of conduits supplies fluid to the top set of bearing pads as shown in FIGURE 3. Two additional systems are provided (not shown) to supply the other two sets of pads shown in FIGURE 3. In the embodiment shown, pads are provided at about 120° intervals around the sleeve periphery, but obviously this number and arrangement may be varied.

Also provided are an inlet passage 36 in housing 16 and an arcuate fluid receiving slot 37 on the lower side of sleeve 15. Conduit 38 in sleeve 15 connects the inner and outer peripheries of the sleeve to allow fluid passage between the arcuate slot 37 and an annular recess 41.

The inner periphery of sleeve 15 as more clearly shown in FIG. 4, is provided with a series of grooves or channels 42 and intermediate lands or surfaces 44. At one end of the channels 42 is an annular groove or channel 45 which makes fluid flow possible between the channels 42. A second annular groove 49 allows the fluid to pass to outlet spill 50. Likewise, spill 50 serves bearing pads 24. A corresponding spill 52 is provided at the opposite end of sleeve 15 to serve as an outlet for bearing pads 22. Surfaces 53 and 54 are provided to guide the large shaft portion 13 and the small shaft portion 14, respectively, within the sleeve. Outlet orifices 55 and 56 (FIG. 2) located at the lower part of the outer housing 16 connect to drain lines 9 (FIG. 1) and thus form a return line to the pump 5.

A location-rod or push-rod 60 (FIG. 2) extends through an opening 61 in the end cap 17 of housing 16 and abuts against sleeve 15. A bearing surface 62 such as a ball bearing is provided at the end of the rod to alleviate frictional resistance between the rod 60 and sleeve 15. If desired, a fluid bearing may be substituted for the bearing 62. Alternatively, a fluid pressure system may be used in place of the push-rod assembly to further decrease the frictional drag.

As shown in FIG. 3, an opening 64 is provided in the side of housing 16 through which the lever arm 11 of sleeve 15 protrudes. The opening is larger than the arm to allow free angular movement of the latter. The arm is fixedly attached to the sleeve 15 at its inner end, and has member 65 mounted at its outer end. This member 65 rests upon a stationary force measuring and indicating device 10. This device 10 may be a weighing scale, a piezoelectric crystal, a strain gauge, a capacitor type instrument or other suitable indicating device.

The power measuring ability of the dynamometer relies entirely on viscous shear forces developed between the enlarged portion 13 of rotating shaft 12 and the adjacent inner peripheral surface of the sleeve 15. Physical contact between the several parts is not necessary, and further, cannot be tolerated. The pressurized fluid which is necessary for the interfacial or working surfaces 44 is supplied through housing inlet 36 and passes into the arcuate slot 37. Slot 37, like slot 29, is arcuately wide enough to insure a steady supply to the interface 44 even when the sleeve 15 rotates slightly due to the developed reaction torque between it and the shaft 12. After the fluid leaves slot 37, it passes through the conduit 38 in the sleeve and into annular recess 41. The fluid is liberally supplied to the interface 44 by the series of longitudinal channels 42 which are cut into the inner peripheral face of sleeve 15. These channels 42 may best be seen in FIG. 4. Obviously other fluid network designs for the interface may be utilized, the only requirement being to supply the surfaces 44 between the channels with a copious amount of fluid within which the viscous shear force is developed. The fluid should preferably be cooled after being acted upon in the interface region. It leaves the dynamometer by flowing into the peripheral channel 45, through peripheral channel 49, and then out the lower spillway 50 into the conduits 9. This flow pattern in combination with the return line allows a continuous supply of cool fluid to be present in the dynamometer at all times. It is apparent that this fluid, which is preferably oil, but which may be any other fluid capable of developing a viscous shear force, is essential to the operation of the dynamometer In operation, as the central shaft 12 rotates at a high speed, a shearing force develops in the oil at the interface 44. The clearance between the adjacent surfaces of the enlarged shaft portion 13 and the sleeve 15 is relatively small but definite. The shearing force developed in this small clearance causes a resultant torque to be placed upon the sleeve 15, and because the sleeve is prevented from rotating by the radially projecting arm 11, the torque is transmitted through the arm to the indicating device 10. If the area of interface and the clearance between the adjacent surfaces are kept constant, the resultant torque is directly proportional to the speed of the power shaft 4. Therefore, a direct indication of power is obtainable once initial settings have been made.

Since the device is designed for use in high-speed low-power applications, friction must be kept to a minimum to obtain results of high accuracy. This is accomplished by the sets of hydrostatic bearing pads 22, 24, 25, and 27, which keep the coaxial parts centrally located. The fluid which is supplied to these pads may be the same fluid that is used for the interfacial surfaces 44. It too is cooled in cooler 7, and is forced through conduit 8 into the housing inlet port 28. From there it passes into arcuate slots 29 and conduits 31 to the fluid pads on the inner and outer peripheries. The fluid leaks out of these pads into housing 16 via outlets 50 and 52. It is then drained through outlets 55 and 56 and is forced by pump 5 through the cooler 7.

The operation of the externally pressurized hydrostatic bearings depends upon a clearance between the coaxial parts adjacent the several pads. The pressurized oil film caused in these clearances by pump 5 not only supplies low frictional torque but is also not subject to fretting. Changes in the viscosity as a result of oil temperature changes are prevented from changing the thickness or shape of the oil film because of the following principles.

The flow of many fluids, and particularly oil, generally varies inversely with viscosity within the range of viscous flow; that is to say as a liquid becomes thicker, less will flow and vice versa. Rate of flow also varies with pressure.

The relationship between the flow rate through the bearing, pad pressure, clearance, and oil viscosity is:

$$(1) \quad Q = \frac{KPC^3}{m}$$

where:
$Q$ = flow rate through bearing
$P$ = pad pressure
$C$ = clearance
$m$ = viscosity
$K$ = constant depending on bearing geometry For a bearing of fixed geometry and fixed load, P is also a constant. In order that C remain constant, the product of ($Qm$) must remain constant. This is achieved by placing a viscous restrictor in series with the bearing pad. The relation between pressure drop, viscosity, and flow rate for a restrictor of fixed geometry is:

$$(2) \quad Q = \frac{k(p-P)}{m}$$

where
$k$ is a constant depending on restrictor geometry
($p-P$) is the pressure drop It should be noted that Q is the same flow rate as that through the bearing since each bearing is in series with its restrictor. Then, since the pressure drop ($p-P$) is constant, the restrictor causes the product of flow rate and viscosity ($Qm$) to remain constant. This is exactly the relation required to maintain a constant clearance in the externally pressurized bearing.

Stability is maintained for the sleeve 15 on the shaft since any displacement causing an increase in the clearance adjacent one pad will cause a decrease in a pad on the opposite side, thus the flow rate would be increased to the first pad to cause a decrease in pressure on that side and the flow rate would be decreased in the second pad to cause a pressure increase on that side. The coaxial parts would thus center themselves. The same relationship holds true for the sleeve 15 within the housing.

Since the device operates on the viscous shear principle with a resulting simple linear relationship, the introduction of a new variable by the use of plain or even antifriction mechanical bearings would defeat the simplicity of the device. The hydrostatic pads, on the other hand, merely create additional reaction torque which is also directly proportional to the speed of shaft 12, and therefore the addition of the bearing pad torque and the interfacial surface torque still results in a simple linear relationship.

The subject dynamometer may be easily and readily adapted to any of a range of power outputs. Since the reaction torque is directly proportional to this interfacial area, adaptation to different power ranges is accomplished by alteration of the interfacial contact area between the enlarged shaft portion 13 and sleeve 16. The hydraulic fluid constantly forced into recess 41 tends to cause sleeve 15 to move off the enlarged portion 13 of the shaft. Counteracting this fluid force is the manual push-rod 60 with its bearing tip 62. In order to lessen the interfacial contact area and the instrument sensitivity, therefore, it is simply necessary to withdraw the rod from the housing a desired amount and the sleeve will follow. The range of interfacial area available is therefore very great. Furthermore, this adjustment may be made just as easily while the unit is in operation as while it is at rest. This aspect of the invention is very important, especially when a power source capable of a large power range is tested. The flexibility of the unit is even greater, however, due to the sleeve member, since the amount of clearance between the sleeve 15 and the shaft portion 13 has a direct effect on the amount of resultant torque obtained. Thus the substitution of any of an entire series of sleeves will vary the reaction considerably and will allow a variety of power sources to be tested. The power range measurement possibilities may be further enhanced by tapering the outer periphery of the shaft and the inner periphery of the sleeve so that the movement of the sleeve on the shaft would result in a simultaneous change in interfacial area and in clearance between the coaxial parts.

Thus it is seen that the invention embodies a dynamometer which is relatively simple in construction and operation, but which is capable of great accuracy, especially for high-speed, low-power applications. While various modifications within the spirit of this invention may occur to those skilled in the art, these are contemplated by the inventor to be within the scope of legal protection provided for and limited only by the appended claims.

What is claimed is:

1. A power measuring device suitable for application to rotary power sources, comprising a driven shaft having a section of increased diameter, a coupling between said driven shaft and said rotary power source, coaxial parts including an annular reaction collar mounted on said driven shaft and a casing around said collar, a plurality of circumferentially spaced hydrostatic bearing pads located on both ends and on the inner and outer peripheries of said reaction collar keeping said coaxial parts in a central position and preventing any metal-to-metal contact, the adjacent surfaces of said increased diameter section of said driven shaft and said collar providing an effective reaction area therebetween, adjustment means to vary said reaction area, pumping and cooling means connected to said casing for supplying fluid to said reaction area and said hydrostatic pads, a conduit system within said collar facilitating pumping of said fluid, an arm attached to the periphery of said reaction collar and projecting radially through said casing, and a force measuring device adjacent the free end of said arm to effectively detect and indicate the reaction torque on said collar and thus the power of the source under test.

2. An hydraulic dynamometer capable of being adjusted for varying power loads of rotary power shafts to be tested comprising, a driven shaft adapted to be coupled to a power shaft and having a section with a larger diameter than that of the axially adjacent sections of said driven shaft, an annular collar held in close proximity about said larger diameter section, hydrostatic centering means between said collar and said shaft section preventing metal-to-metal contact therebetween, said collar having a network of channel-type conduits on its inner periphery axially inwardly of said hydrostatic centering means, a fluid in said network and having developed therein viscous shear forces upon relative rotation between said driven shaft and said collar, a housing hydrostatically centered about said collar and said shaft, a torque detecting and indicating means coupled to said reaction collar to measure the resultant torque on said collar, and adjustment means for axially moving said reaction collar over a lesser or greater portion of said larger diameter section of said driven shaft to vary the effective interfacial area between said collar and driven shaft.

3. The device as defined by claim 2 wherein said adjustment means comprises a manual push-rod for longitudinally moving said reaction collar over a greater portion of the enlarged diameter section.

References Cited in the file of this patent

UNITED STATES PATENTS

| | | |
|---|---|---|
| 1,597,064 | Davidson et al. | Aug. 24, 1926 |
| 1,642,095 | Tracy | Sept. 13, 1927 |
| 1,673,953 | Schmidt | June 19, 1928 |
| 2,977,790 | Dubsky et al. | Apr. 4, 1961 |

FOREIGN PATENTS

| | | |
|---|---|---|
| 539,751 | France | Apr. 6, 1922 |

OTHER REFERENCES

"Dynamometers with Oil-floated Trunnion Bearings," brief (Gen. Elec. Co.) appearing in Instruments and Automation, vol. 27, June 1954, pp. 956–957.

"A Coaxial-Cylinder Viscometer for Non-Newtonian Fluids," by Merrill, ISA Journal, vol. 3, No. 4, April 1956, pages 124–128 relied on.